United States Patent
Gupta et al.

(10) Patent No.: US 6,745,388 B1
(45) Date of Patent: Jun. 1, 2004

(54) EXPANDED OBJECT MODEL INCLUDING ROLES

(75) Inventors: Prashant Gupta, Monterey, CA (US);
Katrina A. Mellen-Garnett, Hillsborough, CA (US); Srinivasan Suresh, Alameda, CA (US); Susan George Orban, Burlingame, CA (US); Michael Harold Stoner, San Francisco, CA (US); Charles Dan Phillips, Cupertino, CA (US); Glen Bentley, Burlingame, CA (US); Suresh Bhat, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/283,663

(22) Filed: Apr. 1, 1999

Related U.S. Application Data

(63) Continuation-in-part of application No. 08/780,593, filed on Jan. 8, 1997, now Pat. No. 5,913,061.

(51) Int. Cl.7 ............................................. G06F 9/40
(52) U.S. Cl. .................................................... 719/315
(58) Field of Search ................................. 709/328, 318, 709/101, 310–320

(56) References Cited

U.S. PATENT DOCUMENTS 5,913,061 A * 6/1999 Gupta et al. ............... 709/310
6,088,739 A * 7/2000 Pugh et al. ................. 709/315
6,094,688 A * 7/2000 Mellen-Garnett et al. ... 709/328
6,543,046 B1 * 4/2003 Lunt .......................... 717/105

FOREIGN PATENT DOCUMENTS

EP          0853277 A2     7/1998     ............. G06F/9/46

OTHER PUBLICATIONS

Orfali et al., "The Essential Distributed Objects Survival Guide", John Wiley & Sons, Inc., 1996, pp. 239–246.*
(no author given) "San Francisco Concepts & Facilities", IBM International Technical Support Organization, Rochester Center, Feb. 1998, pp. 1–129.*
Lippman, Stanley B., "C++ Primer" $2^{nd}$ edition, Addison–Wesley, 1991, p. 389.*
Orfali, R. et al. The Essential Client/Server Survival Guide, $2^{nd}$ edition. John Wiley & Sons, Inc., 1996.*
Eurescom Participants: "Management of Multimedia Services", May 31, 1998, pp. 1–36.
Internet Article: "UML Notation Guide version 1.1", Sep. 1, 1997, XP002171723.
Internet Article: "UML Semantics version 1.1", Sep. 1, 1997, XP002171724.

* cited by examiner

Primary Examiner—St. John Courtenay, III
(74) Attorney, Agent, or Firm—Holland & Knight LLP; Romualdas Strimaitis

(57) ABSTRACT

An expanded business object model including one or more business objects including an inheritance property such that each business object includes a plurality of subtypes and roles for defining a functional aspect of the business object in a collaboration.

15 Claims, 6 Drawing Sheets

EXPANDED OBJECT MODEL INCLUDING ROLES

CROSS-REFERENCE TO RELATED APPLICATIONS

This application is a continuation-in-part of U. S. application Ser. No. 08/780,593 filed on Jan. 8, 1997, now U.S. Pat. No. 5,913,061 the benefit of whose filing date is hereby claimed.

BACKGROUND THE INVENTION

The present invention relates generally to computing systems, and more particularly to a method and apparatus for providing collaboration between applications operating in an information system.

Corporations have spent billions of dollars a year to implement custom, standalone information systems that address specific business domain functionality requirements such as accounting, payroll, manufacturing, and distribution. By creating these separate, standalone systems, each individual section of the business process became isolated from the others.

Over time, Corporate Information Technology (CIT) departments began shifting away from in-house development of these custom systems and have attempted to minimize costs by purchasing enterprise applications on the outside. Enterprise applications are more generic, providing general business functionality in a pre-packaged product. Typically, enterprise applications include heterogeneous combinations of application systems, hardware platforms, operating systems, third- and fourth-generation languages, databases, network protocols, and management tools. While these applications bring tremendous benefits to the companies that implement them, on an enterprise level, they only exacerbate the proliferation of "process islands" because they are not readily integratable.

Stand-alone enterprise applications provide powerful tools for handling many business processes. However, some functionality is often duplicated in separate applications, driving up the cost when bundling enterprise applications. Custom functional integration between enterprise applications, while desirable, is generally cost prohibitive, and defeats the benefits of the make-versus-buy decision to purchase the enterprise application in the first place. Tool and middleware vendors offer solutions for data integration, but not function integration, and even those solutions require significant custom coding to implement.

A collaboration system is described in commonly owned U.S. Pat. No. 5,913,061 entitled "Modular Application Collaboration" to Prashant Gupta et. al., filed Jan. 8, 1997, the contents of which are expressly incorporated herein by reference. Therein a modular application collaborator was described for providing inter-operability between applications. The collaborator included two or more connectors for communicating with applications and an interchange server. The interchange server was a non-distributed single server and provided an object-oriented, multi-user transactional execution environment for execution of collaborations. The interchange server included an application collaboration module and service module. The service module transferred messages between connectors and the application collaboration module. The application collaboration defined the inter-operability between two or more applications.

The collaboration system included a simple object model. A single, generic format for each business object in the system was provided. Each application connector included an application specific version of that business object. The application collaboration only deals with the generic forms of the objects. This results in an n-1-n conversion scenario for any object type.

The primary shortcoming of this model is the large and monolithic character of the generic object. Having a single generic object requires a great deal of cross-application analysis in order to extract the "best practice" combination of attributes, and is close to impossible in some cases. In addition, the collaborations/business objects, were not inheritable/extensible. The lack of inheritance makes it difficult to design business objects that are specific to subject areas and yet share several common attributes.

In addition, the interchange server was not completely componentized. This limited the ability to plug and play third party components into the server, and also limited the availability to take advantage of third-party services usable by well componentized systems.

The proposed object transformation scheme relied on a third party tool that provided inadequate programmatic interfaces, causing inconsistency between the specification of a business object and the specification that the tool used, inadequate diagnostic support during execution, and poor performance.

The communication between the connectors and interchange server always used 'store and forward' message queues, even when 'store and forward' facilities were not needed. This also limited data throughput. A proper versioning mechanism that allows a way to specify version dependencies between components and a way to manage the dependencies was not provided by the existing system.

As described above, the basic object model proposed was a simple one designed to create generic business objects. However, difficulties arise when implementing a generic object. Turning to a particular example, let us examine a generic customer business object. Some Customer Interaction Management (CIM) or Enterprise Resource Planning (ERP) applications define customer objects and store a customer's address data as dependent records of the customer object. In other words, the addresses do not exist independently of the customer data and can be accessed only through their parent customer object. These addresses are not used by more than one customer object ("SoldTo" customer). Examples of applications that store information in this way are applications produced by Baan, Oracle, Vantive, and Trilogy.

Alternatively, some CIM and ERP applications store customer data in a hierarchy of independent objects. The customer role at the top of the hierarchy represents the customer with whom an order can be placed. This "SoldTo" customer links to other customer objects through roles. Examples of roles include a "ShipTo", "BillTo" and "Payer" roles. FIG. 1 illustrates a typical SoldTo customer with its relationship to other customer objects.

In these applications, the subordinate customer objects can be associated with more than one customer object ("SoldTo customer") and can be created before the customer object is created. Because the customer object stores the links to its related customers, the subordinate customers must exist before the customer object can contain the links to them. Examples of applications that store information this way are applications produced by SAP, PeopleSoft, and Clarify. Problems arise when trying to create a generic business object that supports both of these types of object definitions.

SUMMARY OF THE INVENTION

An object model and system is provided wherein customer's address data or subordinate customers are represented as a separate "customer partner" business object. Synchronization occurs as a multi-step process in which the customer business object is created, customer partner business objects are defined and the relationships between the Customer and its related customer partners are updated. The Customer and customer partner business objects are created so that the relationship between a customer object and its subordinate customer or address is always stored in the parent object (that is, the Customer business object references the customer partner business object). Applications that store the relationship in the child object are configured to trigger an application-specific business object that maps to the customer business object.

The current business object model has been extended to support a hierarchy of objects, providing the ability to inherit and extend more generic business objects into those specific for a subject area. In addition, business objects provide multiple views, allowing different collaborations to view the same object in different ways. Collaborations support inheritance to allow them to be inherited and extended.

The component model proposed herein allows the subsystems (services, collaborations, connectors) in the interchange server to adhere more strictly to a component model, interacting with other subsystems via well-defined interfaces. This allows services from third-party vendors to be plugged into the infrastructure easily. The component model adopted is along the lines of the Enterprise Java Bean model.

The distribution model consists of a distributed object bus that provides a single namespace for multiple interchange servers, and a set of distributed services (object transformation, transaction, etc.). Content-related components such as collaborations and connectors execute in their own containers that interact with the bus to avail the services.

The services provided by the interchange server are enhanced to be more robust and easily usable. These include an object transformation service, a concurrency service for optimal concurrent execution of collaborations, a life cycle management service, a localization service to support multiple locales, and a versioning service to help specify version compatibility matrices Lighter weight mechanisms are provided whenever 'store and forward' message queues are not required.

DESCRIPTION OF THE PREFERRED EMBODIMENTS

Figure 1:
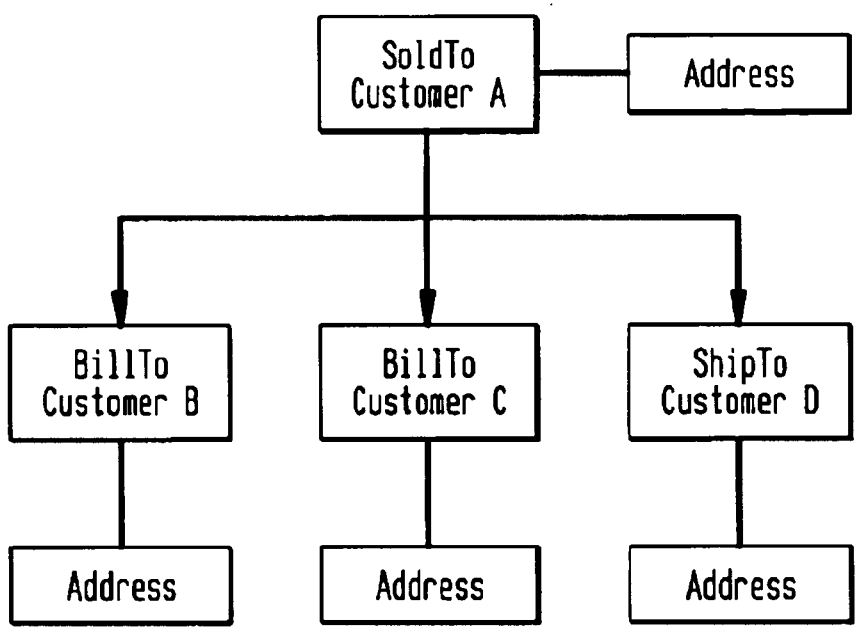
FIG. 1 shows a typical, SoldTo customer with its relationship to other customer objects.

A number of terms are used herein to describe collaborations and related structures. "Administrative Domain" refers to the sphere of control in the collaboration system that encompasses and defines the system topology, distribution, installation, dependency management, monitoring, and operational control. "Application Connector" refers to a set of software components that interacts with an enterprise application (such as an ERP or CIM application) on behalf of the collaboration system. "Connector" refers to a program that interacts with an application on behalf of the collaboration system. "Service Connector" refers to a set of software components that interacts with an external enterprise service (such as e-mail) on behalf of the collaboration system.

"Container" refers to a manager object that manages the creation, execution, access and administration of multiple instances of another object, and interacts with other containers in a server. "Collaboration object" refers to the object that contains the business logic to be executed upon arrival of an event. "Collaboration Manager" refers to the execution environment and container for collaboration objects. "Server or interchange server" refers to an execution environment and container for the collaboration manager and other service containers. "Distributed Service" refers to a set of software components that implements a particular software service within the collaboration environment.

"Customer" refers to any business partner, with whom a company maintains at least the first relationship and possibly one or more of the second through fourth of the following relationships: sells products or services to the business partner; ships products to the business partner; bills the business partner for products or services; and, receives payment from a business partner for products or services. "Customer partner" refers to an entity that is related to the customer. It can be another customer or it can simply be an address on the customer.

The expanded object model includes one or more generic business objects each of which can have subtypes. The types of generic business objects includes a generic customer, generic employee, purchase order, invoice general ledger, bill of materials, contracts, price lists, and spare parts. The number and kinds of subtypes can be specific to the class of generic business object. For example, instead of a single generic notion of a customer object, there can be defined several forms. Customer objects subtypes can include: a top-level least-common-denominator customer object, a CIM-oriented customer object, an ERP-oriented customer object, and an MRP-oriented customer object.

The collaboration system provides conversions between these various forms of generic object. It is the responsibility of individual connectors to implement a conversion between their native object form and one of the generic forms. This approach accomplishes two critical goals. First, the one-size-fits-all generic object can be departed from without degenerating into an n-to-n integration scenario (and the combinatorial explosion of maps that n-to-n implies). Second, it retains ease of development for connectors, because each connector needs only a single bi-directional map for each application-specific object to connect that object into the generic hierarchy.

Figure 2:
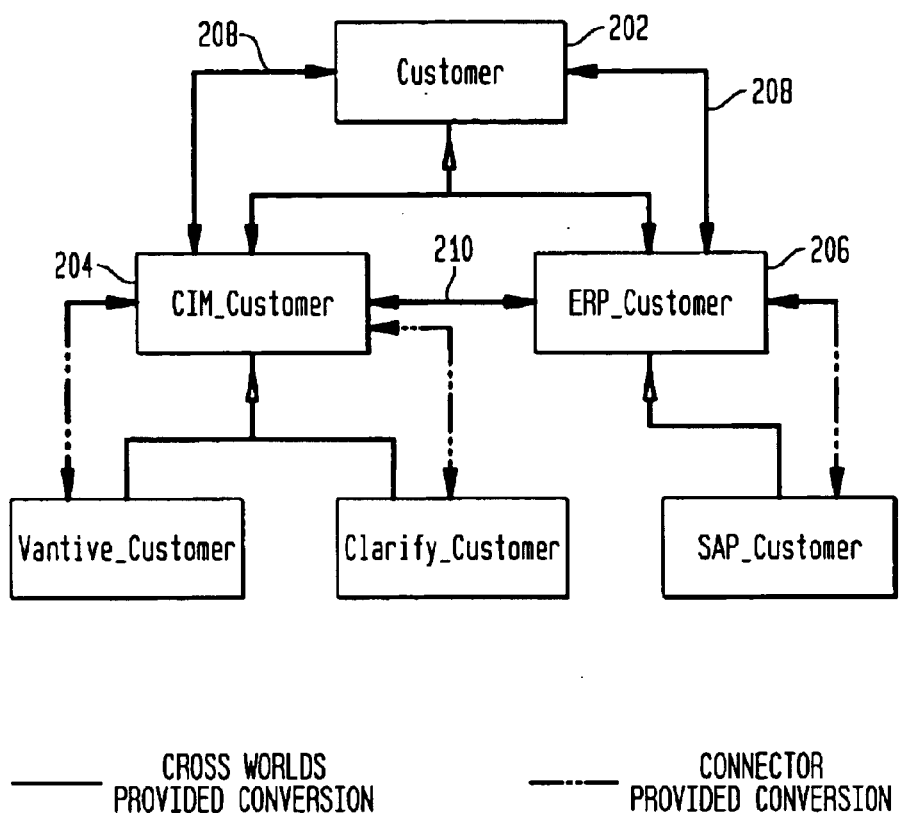
FIG. 2 shows an expanded object model for a customer object is shown.

Referring now to FIG. 2, an expanded object model for a customer object is shown. The expanded object model uses an inheritance notation to indicate the relationships among the entities involved. The object model includes a top-level customer object 202, a CIM customer object 204 and ERP customer object 206. The inheritance is a logical inheritance relationship, however, and may or may not be implemented as actual class inheritance in a programming language.

Conversions 208 between child and parent in the generic portion of the object model, as well as directly between children 210 is shown. These conversions are extremely trivial and require no use of mapping facilities. Their presence guarantees that some conversion can be done between any two objects in a hierarchy, albeit a very lossy one.

The object model can be easily extended to allow new subtypes in the hierarchy for purposes other than connectors' application-specific objects. For example, certain collaborations might want a special object for their use (perhaps a customer stripped of sensitive fields so that an "access" collaboration could expose it to external users). Note that the collaboration developer would also need to provide a conversion map to "attach" the new subtype into the hierarchy. Ideally, we might be able to provide conversions automatically in some cases (simple subsets with identical attribute names, for example).

In addition to the inheritance model (e.g., sub-types), each business object can provide multiple views of itself, each view exposing a subset of the object's attributes.

Each business object fills one or more roles. An object's essential role is itself. In other words, a CIM_Customer can always act as a CIM_Customer. However, there will be additional roles that some objects can and need to fill. For example, both CIM_Customers and ERP_Customers may need to fill the role of Billable_Customer (a customer with just a name, an ID, and a billing address, for example).

Figure 3:
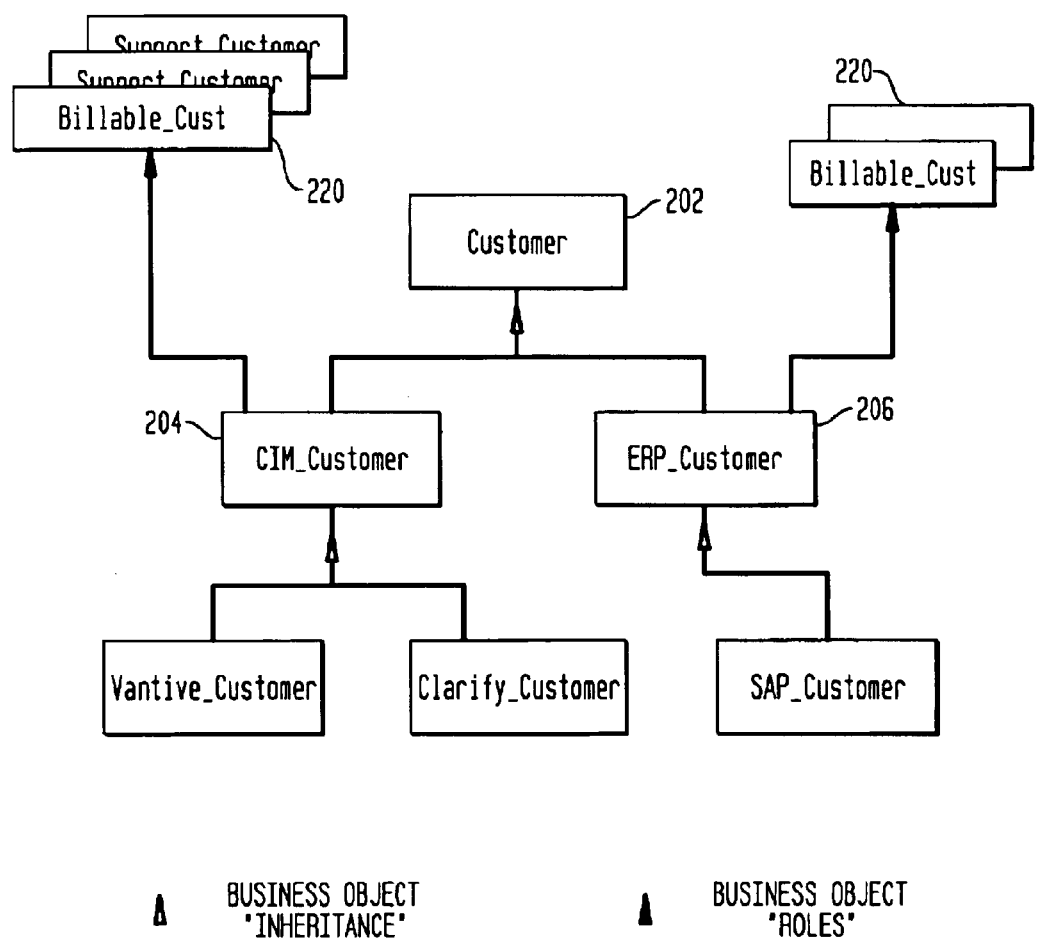
FIG. 3 shows the relationship of roles to the basic business object hierarchy.

Roles have attributes and operations associated with them, just as business objects do. The relationship of a role to a business object is analogous to that of a Java interface to a Java class. An interface defines a set of behaviors, and a class guarantees that it supports those behaviors by implementing a particular interface. FIG. 3 shows the relationship of roles 220 to the basic business object hierarchy.

For a business object to support a particular role, that role must contain a proper subset of the business object's characteristics. In other words, roles are partial "views" of a business object. They do not add information to the business object, they simply filter out attributes and operations that are irrelevant to a particular context.

Ideally, however, generic objects and application-specific objects should have knowledge of what role they are currently filling. This allows a connector to retrieve/process only the information relevant to the current role. In the example above, a retrieve on a Billable_Customer could be performed on a CIM_Customer object or an ERP_Customer object, but only the header and billing address are needed to be retrieved. The present object model with roles allows for an optimization to retrieve only that information that is required from an application, instead of retrieving an entire customer record.

Notably, some constraints of the current mapping technology limit options in this area somewhat. An implementation of roles can easily result in an explosion of application-specific objects and transformation maps. Since defining application-specific objects and their maps is most of the work in writing a connector, this effect should be minimized.

Figure 4:
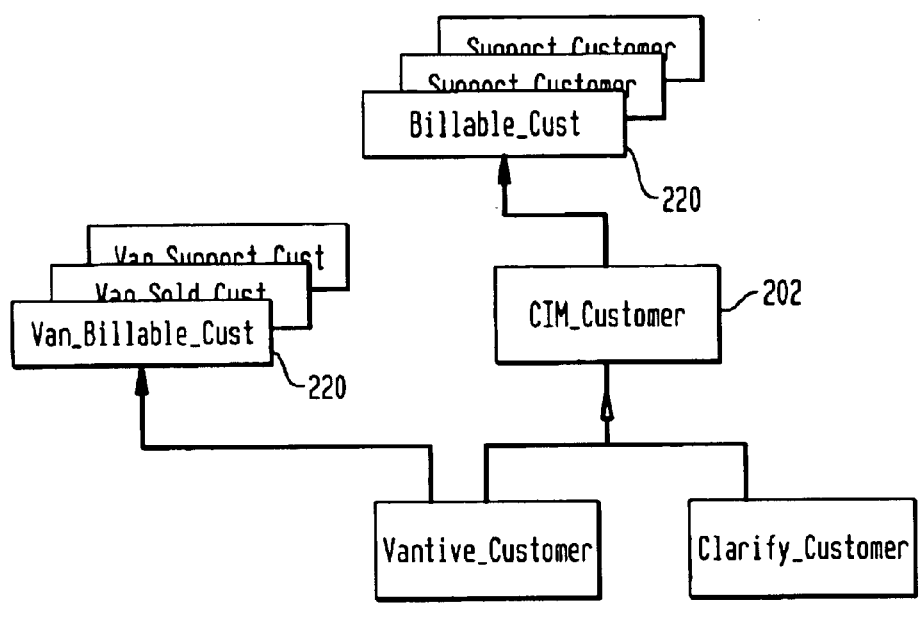
FIG. 4 shows an object model where each connector defines one application-specific object for the generic object as a whole and one for each role supported by the generic object.

One workable approach is shown in the FIG. 4. Each connector defines one application-specific object for the generic object as a whole and one for each role supported by the generic object. These application-specific role objects are related to the "main" application-specific object in the same way that roles relate to the generic objects. As long as these application-specific role objects are strict subsets of the primary application-specific object, then only one object transformation map is needed.

In one implementation, the object model includes a customer partner subtype for an object. The customer partner subtype can be contained in the object, can be a role or a subtype or the whole object itself.

Collaborations interact with roles. Each business object supports at least one role, itself, and may support additional ones. The use of roles maintains a useful separation between the use of an object and its implementation. This implies that collaboration designers or collaboration configurers must know about the relationship between roles and business objects. However, given that a particular collaboration is configured to communicate with a particular connector, when a collaboration creates an object for eventual delivery to a particular connector, the collaboration runtime can resolve any questions concerning which roles are appropriate. The collaboration runtime can identify the appropriate object at configuration time or at startup time by evaluating the objects supported by the connector. If, however, the connector supports multiple objects that implement the desired role, then a human decision is needed. In addition, collaborations may create objects that are destined for other collaborations, not for connectors. In this case as well, the collaboration developer or configurer can specify which object should actually be created.

This same problem is not present in the subscription service supporting the interchange server. The subscription service can include subscriptions that use roles exclusively. When a collaboration subscribes to a role, it is guaranteed to receive an object which implements that role. Since the collaboration only uses attributes and operations associated with the role, the collaboration doesn't care what object lives behind the role.

The design model consists solely of metadata and of tools that provide views of that metadata to end users and developers. The runtime uses the metadata as configured by developers and administrators and implements that desired behavior. There is a close relationship between design time and run time, but there are significant deltas as well.

In the collaboration system described above, all business objects were command proxies. Their definition consisted of a set of attributes and a set of possible operation names (verbs).

A particular business object instance consisted of a set of values (one for each attribute) and one of the operation names.

The business object did not itself perform the operation, it served as a message that the operation either had been or should be performed by some other entity.

These business objects were exchanged among collaborations and connectors. Any connector or collaboration could create a new business object, but only connectors have the ability to convert one kind of business object to another.

Figure 5:
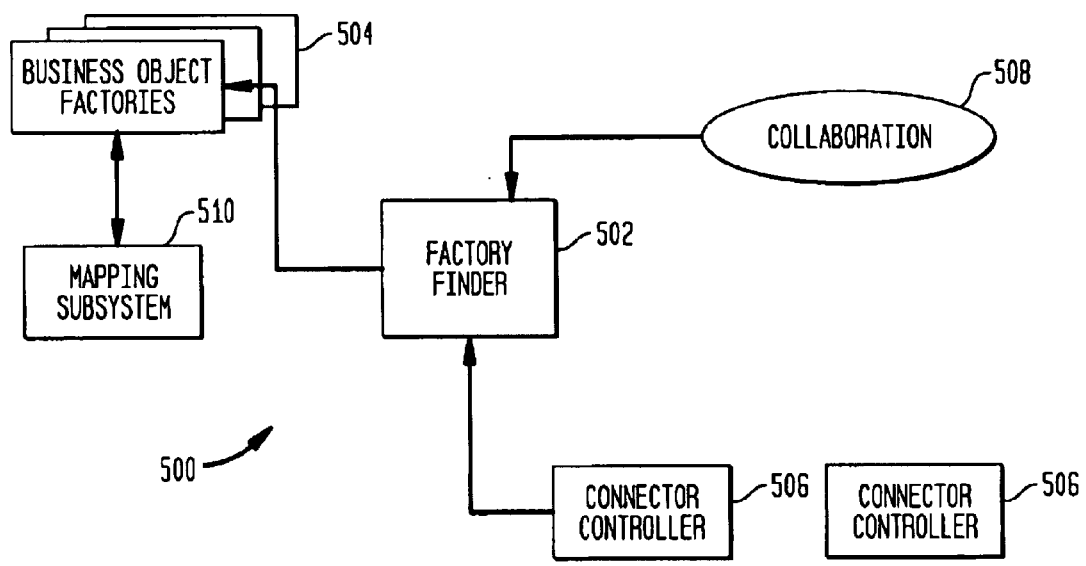
FIG. 5 shows a runtime environment for a collaboration system.

The new runtime environment 500 is shown in FIG. 5. Not all elements of the interchange are shown, only those that are relevant for the runtime object model. The runtime environment is characterized by a factory finder 502, one or more business object factories 504, connector controller 506, collaboration 508 and mapping subsystem 510. Factory finder 502 is a directory to the business object factories 504. Business object factories 504 create instances of a particular business object either from a source business object, or from scratch. They can also perform conversion from one business object type to another—asking for a new business object of a particular type from an existing one of a different type causes this conversion.

As the new object model implies, conversions between business object types can happen in multiple places. No longer do object conversions occur only inside of the connector controller 506. Object conversion now occurs under the purview of the relevant object factory, or even directly on behalf of a particular active entity, such as a collaboration 508 or connector (not shown).

The mechanism of object conversion is mapping subsystem 510. Mapping subsystem 510 converts objects from one object type to another. Look-ups and various other implementation aspects are handled by the mapping subsystem. Mapping can be abstracted out into a separate transformation service (not shown). This service is accessible to any entity within the interchange server, but is generally accessed indirectly via business object factories. This service also may be local or remote. When several interchanges are federated, this allows conversion services to be distributed or consolidated, depending on administrator policy.

In one implementation, object sets are supported. An object set is a group of object that can be sent as a unit. Object sets are useful in several contexts including: batch-oriented business processes in which many records need to be processed at once; query results; and semantic impedance matching between entities.

The first two are self-explanatory. As for the third, suppose a collaboration passes an object X to a connector. Assume further that this connector's application is somewhat unique, and to create the equivalent of an X in the application it must actually create three distinct top-level entities in the application, A, B and C. Each of the three needs to be created completely independent of the others, and creation of any of the three could fail. In addition, each of the three could be created on its own under other circumstances. The easiest way to accomplish this for the connector is to define three application-specific objects and then create a transformation map which takes an X as input and generates an A, a B and a C as its output. We would like to send all three of these operations to the connector agent as a unit and receive back status on their operations in a unified way (because the collaboration thinks it's only performing one operation) even when the connector agent processes them individually.

For the sake of clarity, a generic customer business object is described in more detail below. The generic customer business object is a hierarchical object that can support a one-to-many relationship between customers and customer partners. The customer partners include, but are not limited to, the ShipTo, BillTo, and payer. A customer partner represents an entity that is related to the customer. In one implementation, a customer object is defined as the entity that exists as the 'SoldTo' or highest level customer object in an application. In most applications, the 'SoldTo' could fulfill all of the above relationships. This is the customer that is used in sales order processing. Customer partners are created for other related objects including ShipTo, BillTo, Payer, Postal Address, or Delivery Address to name a few. The various applications store customer information in different ways. Even with these differences, there are two categories in which an application can fall into Customer with relationships to addresses, and Customer with relationships to other customers.

As described above, some of the CIM and ERP applications do not store different customer roles; the applications only store multiple addresses. These addresses can not exist as stand alone (i.e. independent) objects—they can only exist as part of the Customer object. For example, you could not create a billing address without first creating the customer that the billing address was going to be linked to.

When working with these applications, each address is mapped to a customer partner object as a first class object. For example, if you create a Customer with a Billing address in an application, this should trigger the following objects: 1) the Customer Object and 2) the customer partner object. On the customer object, the application's Address Id would be mapped to the ObjectId attribute on the RelatedCustomerRef container. Note that the RelatedCustomerRef contained object is only going to contain the reference to the Address—not the actual address attributes. These would be sent over in the customer partner object as a first class entity.

Also as described above, some ERP and CIM applications have a customer hierarchy, where a 'SoldTo' customer is the top level. This customer role, called SoldTo, represents the customer with whom an order can be placed. This SoldTo customer can have links to many other customers through roles. These roles consist of, but are not limited to, the relationships for the ShipTo customer, BillTo customer, and payer. In this situation, the SoldTo is actually linked to other customers that exist in the application independently of the SoldTo customer. In this case, the only information contained in the RelatedCustomerRef contained object would be the reference to the other customer (i.e. the CustomerId of the other customer). These other customers could be created whether or not the SoldTo they are going to link to exist yet or not.

Figure 6:
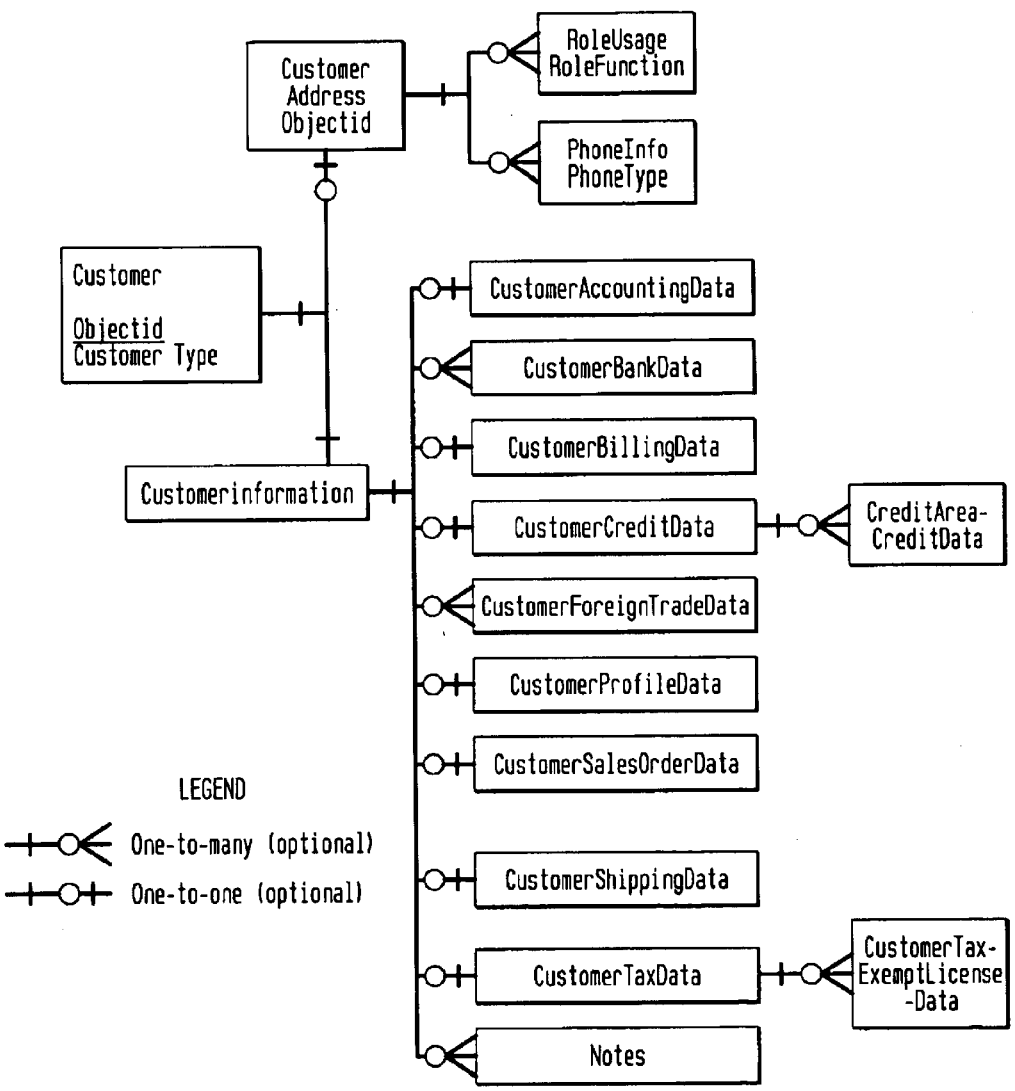
FIG. 6 shows a generic customer object hierarchy.

The generic customer object hierarchy is shown in FIG. 6 and has 2 distinct sections. The top-level information is for the SoldTo customer. The RelatedCustomerRef container is for the reference to the customer/address that is linked to the SoldTo Customer. There is another first class object called the customer partner object, which is actually used for the synching of the ShipTo, BillTo, and Payer information.

Outlined below is an approach that the applications can follow in using the customer and customer partner business objects.

Only the "SoldTo" customers are sent as customer objects. Any other customer/address (ShipTo, BillTo, etc . . . ) are sent as a customer partner object. When sending the relationship between a SoldTo customer and another customer/address (ShipTo, BillTo, etc . . . ), the application triggers the customer object and the id of the address/customer that is linked to the SoldTo is sent in the RelatedCustomerRef contained object. The RelatedCustomerRef contained object only contains the reference to the Address/Customer—not the actual values. These are synched using the customer partner object.

The generic customer object contains all the data for the SoldTo customer and the Id of the ShipTo and BillTo information (whether it is an address or another customer) comes over in the RelatedCustomerRef contained object. If the linked entity does not exist in the destination application, a customer manager collaboration handles this process.

The generic Customer business object categorizes each customer object by the attribute customer type and each customer partner by the attribute partner type (note, partner type is found on the generic customer partner object). The customer type (partner type) determines how the customer/address exists in the application. Examples of customer type (partner types) are Soldto, Billto, Payer, Shipto. A sales order can be created referencing a SoldTo customer. Billing documents can only be sent to BillTo customers. It is important that the destination application knows the customer type from the source application. Because most applications handle each type of customer differently, the generic customer business object allows only one type for each customer object. This type is stored as an attribute. A customer can be a SoldTo customer or BillTo customer, but not both.

To simplify processing, some applications allow customer objects to act as more than one type (this is known generically as the role function). For example, a SoldTo customer might reference itself so that it can also act as the ShipTo and BillTo customer. An application can create the SoldTo and reference itself as the BillTo. In this example, the customer type would be SoldTo, and there would be two role functions—SoldTo and Bill to.

In summary, 'type' indicates the kind of customer and 'function' indicates what kind of roles it is playing.

Alternative Implementations

The granularity of transformation can be extended down to the attribute level. For example, if we find reusable fragments of business objects (such as addresses, perhaps) which have just a few commonly-used forms, generic mappings can be provided between such fragments. As such complete conversion specifications can be generated given just the source and destination business objects, if enough semantic information is stored as metadata.

The present invention has been described in terms of specific embodiments, which are illustrative of the invention and are not to be construed as limiting. Other embodiments are within the scope of the following claims.

What is claimed is:

1. A modular application collaborator for providing inter-operability between applications comprising:

a plurality of connectors for communicating with a like plurality of applications;

an interchange server including an application collaboration module and service module, the service module transferring messages between connectors and the application collaboration module, the application collaboration module defining the inter-operability between two or more applications, the application collaboration module including a trigger and a transaction responsive to the trigger, the trigger being activated upon receipt of data from one or more connectors, and the transaction delivering data to one or more connectors for transfer to an associated application; and an expanded business object model including one or more business objects having an inheritance property such that each business object includes a plurality of subtypes and one or more roles for defining a functional aspect of the business object in a collaboration for providing inter-operability between applications.

2. The modular application collaborator of claim 1 wherein the expanded business object model comprises a generic customer object.

3. The modular application collaborator of claim 2 wherein the expanded business object model comprises subtypes comprising a CIM-oriented customer object.

4. The modular application collaborator of claim 2 wherein the expanded business object model comprises subtypes comprising an ERP-oriented customer object.

5. The modular application collaborator of claim 2 wherein the expanded business object model comprises subtypes comprising an MRP-oriented customer object.

6. The modular application collaborator of claim 2 wherein the customer object comprises a role of Billable Customer.

7. The modular application collaborator of claim 1 wherein the interchange server comprises an object transformation service for transforming a generic object to an expanded business object.

8. The modular application collaborator of claim 1 wherein the interchange server comprises a concurrency service for optimal concurrent execution of collaborations.

9. The modular application collaborator of claim 1 wherein the interchange, server comprises a localization service for supporting multiple locales.

10. The modular application collaborator of claim 1 wherein the interchange server comprises versioning service for specifying version compatibility.

11. An interchange server comprising an object transformation service for transforming a generic object to an expanded business object including one or more business objects having an inheritance property such that each expanded business object includes a plurality of subtypes and one or more roles for defining a functional aspect of the business object in a collaboration for providing inter-operability between applications.

12. The interchange server of claim 11 further comprising a concurrency service for optimal concurrent execution of collaborations.

13. The interchange server of claim 11 further comprising a life cycle management service.

14. The interchange server of claim 11 further comprising a localization service for supporting multiple locales.

15. The interchange server of claim 11 further comprising a versioning service for specifying version compatibility.

* * * * *